D. G. STEELY.
METHOD AND APPARATUS FOR COATING CHOCOLATES.
APPLICATION FILED OCT. 30, 1916.

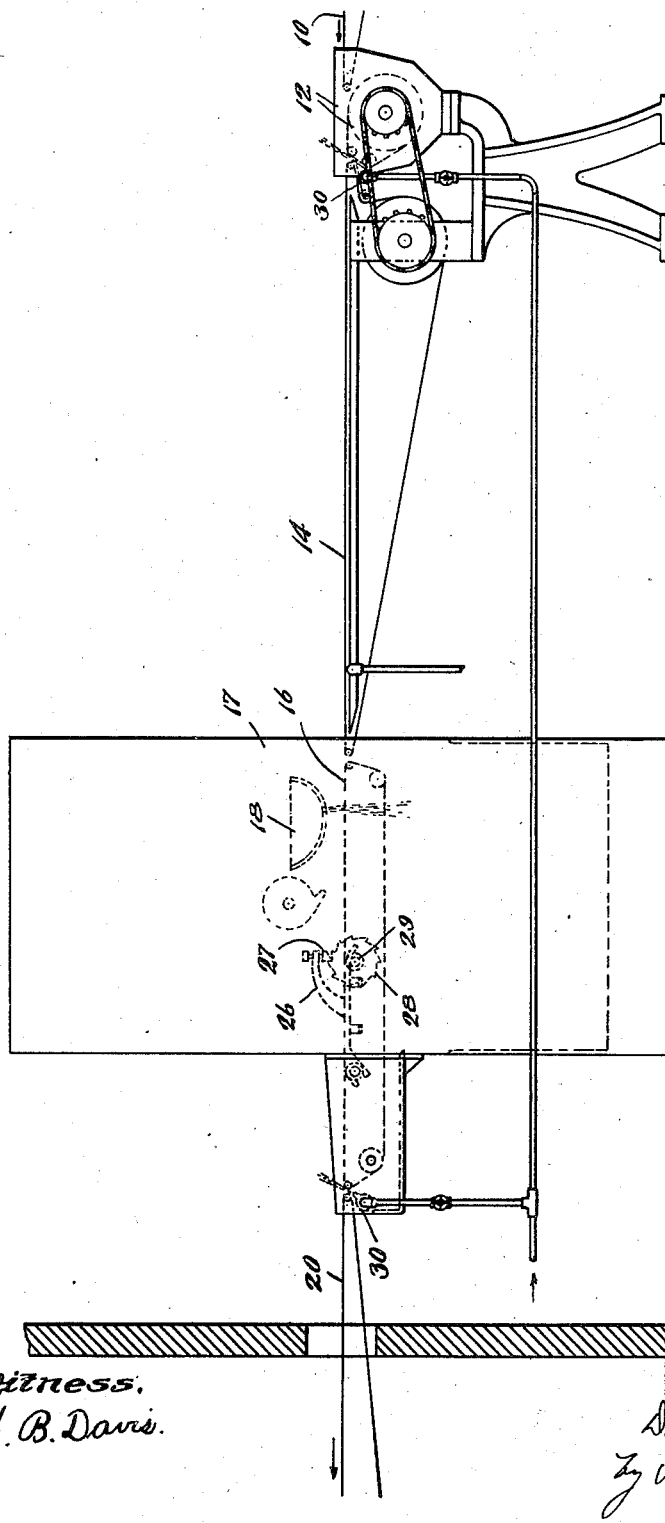

1,226,824.

Patented May 22, 1917.
2 SHEETS—SHEET 2.

Witness.
H. B. Davis.

Inventor.
Dale G. Steely.
By Smyth & Harriman
Attys.

UNITED STATES PATENT OFFICE.

DALE G. STEELY, OF CAMBRIDGE, MASSACHUSETTS.

METHOD AND APPARATUS FOR COATING CHOCOLATES.

1,226,824.　　　　　Specification of Letters Patent.　　Patented May 22, 1917.

Application filed October 30, 1916.　Serial No. 128,377.

*To all whom it may concern:*

Be it known that I, DALE G. STEELY, a citizen of the United States, residing at Cambridge, in the county of Middlesex and State of Massachusetts, have invented an Improvement in Methods and Apparatus for Coating Chocolates, of which the following is a specification.

In coating machines for chocolates and other goods commonly termed "enrobers" the chocolates are conveyed through the machine by moving conveyers and during their passage are presented to suitable coating-means by which they are coated. In certain types of machines the bottoms of the chocolates are first coated and then their tops and sides, and separate conveyers for the chocolates are arranged one in continuation of another, each constructed to function as may be required according to the condition of the coated chocolates carried by it, and the chocolates pass from one to the next conveyer in their passage through the machine.

There are usually several separate conveyers, employed, all of which are endless and arranged with their adjacent ends closely associated to admit of the passage of the chocolates across the spaces from one to the next conveyer, and so on throughout the machine, as for instance there may be a conveyer, made as a screen or grid which carries and coats the bottoms of the chocolates and delivers the chocolates with their bottoms coated to the next conveyer, and said next conveyer may be arranged to convey the chocolates to another conveyer which is made as a screen or grid, and which passes beneath a coating appliance by which the tops and sides of the chocolates are coated, the surplus coating material passing down through the apertures thereof while it is conveying the chocolates to another conveyer, usually called the delivery conveyer, as by it the coated chocolates are conveyed to the packing room.

The coating material is in a more or less liquid state and flows and drips from the chocolates while they are being carried along by the conveyers, and while, or as, they pass from one to the next conveyer "tails" are formed at the bottoms of the side walls of the chocolates, being at the edges of the bottoms, which are very objectionable for the reason that they are unsightly when compared with hand dipped chocolates.

When chocolates, freshly coated in whole or part, pass from one conveyer to the next the coating material at the bottoms of their side walls has a tendency to cling to the conveyer from which they pass, at variously disposed places, of greater or lesser width, and to string out, and such stringing out of the coating material forms one or more "tails" at the leaving or rear ends of the chocolates; or there may be excess portions of the coating material at the bottoms or sides, or both, of the chocolates where drops are forming, but which are not formed sufficiently to fall, or at places where drops have formed and fallen, which excess portions will be drawn out in a rearward direction as the rear ends of the chocolates leave one conveyer in passing to the next, which will form one or more "tails;" and various other causes may lead directly or indirectly to the formation of the tails; but in any event these objectionable tails are formed at the rear ends of the bottoms of most of the machine-coated chocolates when leaving a conveyer, and it is the prevention of the formation of these tails, or their elimination, if formed, which my invention seeks to accomplish.

I have discovered that when a current of air is caused to traverse the space between the adjacent ends of the conveyers, or is delivered in an upward direction against the bottoms of the coated chocolates, while the chocolates are leaving a conveyer, as when passing from one to another conveyer, that the formation of these tails is prevented, or if formed, they are reduced to *nil*, or thereabout, being flattened or smoothed out, and as a result the product of the coating machine will be coated chocolates devoid of tails. My invention, therefore, involves a novel method of accomplishing this result; and also involves pneumatic means by which this method may be carried out as well as, more broadly speaking, means closely associated with the adjacent ends of the conveyers by which the result above stated is accomplished.

In carrying out my invention, I employ means constructed and arranged to deliver a current of air, with but little force, as but little force is necessary, at or near the point of transfer of the coated chocolates from one to another conveyer, said current of air being usually directed upward, in a suitable manner, to engage the bottoms of the coated chocolates; as for instance, I may deliver a current of air through the space between the adjacent ends of the conveyers, as at such point it is effective and produces the desired results. But, I do not desire to limit my invention to the precise point where the current of air is delivered, nor to the angle of delivery, nor to the velocity or volume of the blast as long as it is delivered at or near the end of the conveyer. In some cases I may employ an intermittent blast, where the coated chocolates, or the goods, are quite long, and to control the delivery by hand or otherwise, so that the air will be delivered only at the desired or required moment, as for instance to engage the rear ends of the chocolates as they pass from one to another conveyer. Often times a conveyer is agitated, although not violently, to assist in smoothing out or reducing wrinkles of the coating material on certain parts of the tops and sides of the chocolates, and my invention operates well when associated with an agitated conveyer.

Furthermore, means have been provided for directing a current of air down onto the coated chocolates while they are reposing upon and being moved along by the conveyer, but such current of air has never been delivered, so far as I am aware, at the adjacent ends of two conveyers, or caused to traverse the space therebetween, or blown in an upward direction against the bottoms of the coated chocolates, at or near the end of the conveyer, and hence has never accomplished the result, herein set forth.

Figure 1 is a side elevation of a portion of a chocolate-coating machine having means associated therewith embodying my invention for preventing the formation of or for reducing the tails which are being formed on the chocolates.

Fig. 8 is another embodiment of my invention to be referred to.

Figs. 9 and 10 are details to be referred to.

Figure 3:
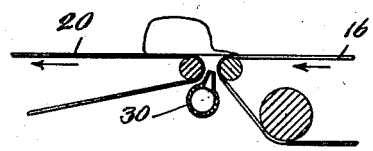
Fig. 3 is an enlarged sectional detail illustrating the pneumatic means of Fig. 2, arranged at the adjacent ends of two conveyers, the coated chocolates being there shown as having tails.

In the machine here shown for the purpose of illustrating my invention, and which is a typical coating machine now on the market, 10 represents a portion of an endless conveyer for delivering the chocolates or other goods to the endless coating and conveying device 12, by which the bottoms of the chocolates are coated and then delivered to an endless conveyer 14, by which they are conveyed to the endless conveyer 16, which is made as a screen or grid and adapted to pass through a receptacle 17, and beneath the coating appliance 18, by which the coating material is caused to flow down upon the tops and sides of the chocolates. This screen conveyer 16 conveys the coated chocolates to the endless conveyer 20, usually termed the delivery conveyer, an end-portion only of which is here shown. This screen conveyer 16 is usually adapted to be agitated, and, as here shown, an agitating device, having an agitating member, is arranged beneath the top portion of the screen conveyer 16, said member having an arm 26 rising from it, bearing a dog 27, adapted for engagement with a ratchet-wheel or other toothed member 28, secured to a rotating shaft 29, said device operating to lift and let fall the top portion of the screen conveyer at intervals, while the rotating wheel is being rotated. These several conveyers are arranged one in continuation of the other, and their carrying portions in substantially the same horizontal plane, with their adjacent ends closely associated, there being a very narrow space between them, so that the chocolates may easily pass from one conveyer to another, and so on throughout the machine.

Figure 2:
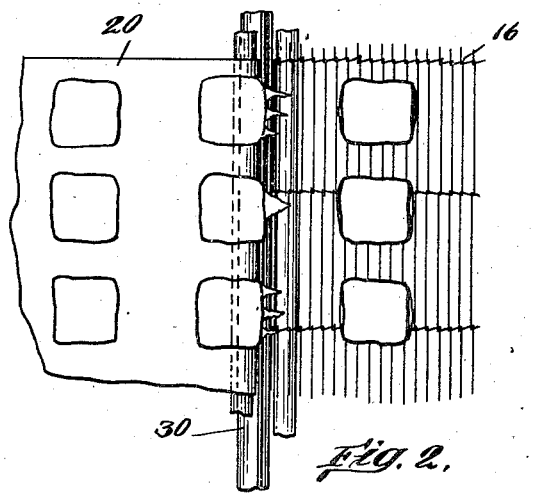
Fig. 2 is a plan view of a fragment of the machine having means illustrating my invention associated therewith at the adjacent ends of two conveyers, and also illustrating coated chocolates having objectionable tails.
Figure 5:
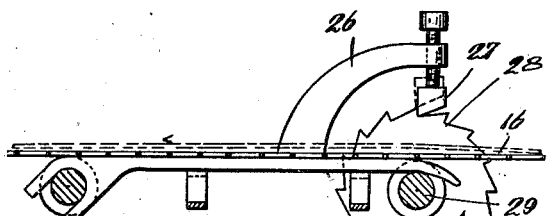
Fig. 5 is a fragmentary detail of a portion of the screen conveyer having an agitating-device associated with it.

In the machine here shown, the chocolates, when leaving the conveyer 12 and also when leaving the conveyer 16, are liable to have tails formed on them, at the rear ends of their bottoms, as represented in Fig. 2, and in this particular machine it is at this place that means embodying my invention are applied, although it will be understood that for other forms of coating machines such means will or may be applied at other places.

Figure 4:
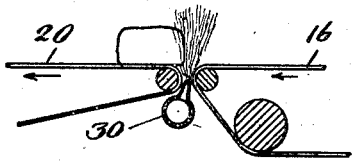
Fig. 4 is a similar sectional detail illustrating the current of air traversing the space between the adjacent ends of the conveyers by which the tails on the coated chocolates will be reduced, or prevented from forming.

In Figs. 2, 3 and 4, I have represented a long hollow air-delivery appliance, consisting of a hollow shell 30, of box-like structure, adapted to be arranged and supported below the adjacent ends of any two conveyers, as 12 and 14, or 16 and 20 and extending throughout the width of the conveyers. This shell may have a narrow slot extended throughout its length, or thereabout, at or near its top, and arranged to deliver a current of air in thin sheet form or stream, at the place desired, and also at the angle desired, and with sufficient velocity and volume.

Figures 9, 10:
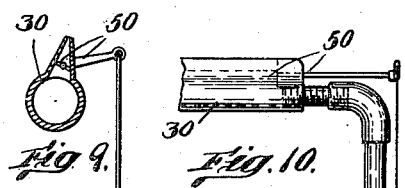
Figure 7:
Fig. 7 is a sectional detail illustrating the adjacent end-portions of two conveyers with pneumatic means embodying my invention arranged back of the end-roll of one of the conveyers to deliver a current of air at the adjacently disposed ends of the conveyers.
Figure 6:
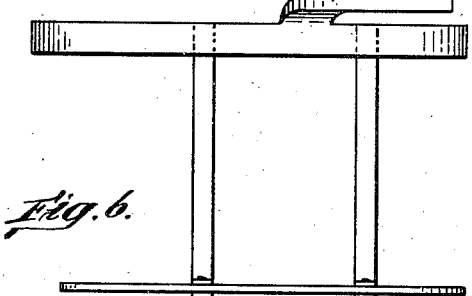
Fig. 6 is a detail portion of the agitating-device.
Figure 8:
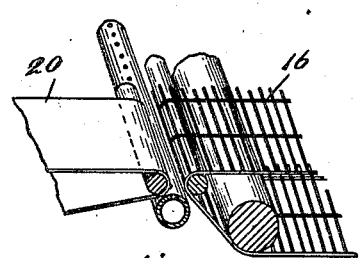

In Fig. 8, I have represented a section of pipe having a series of small perforations arranged in a row, and closely associated together, and extended throughout its length, or thereabout, the pipe being so supported and arranged that the jets of air will be delivered at the proper place and angle, the perforations being so closely associated that a jet of air will form substantially a thin sheet. The air is blown in an upward direction, traversing the space between the adjacent ends of the conveyers, and substantially tangential to the cylindrical end-portions thereof, and will act against the bottoms of the coated chocolates, and as the rear ends of the chocolates are brought into the path of the current of air, any tails which may have formed or which are being formed, as the chocolates pass from one to the next conveyer, will be flattened or smoothed out and thereby reduced to *nil*, or substantially so, and any excess of coating material which may be deposited upon, or which still clings to the edges of the bottoms of the chocolates, will be smoothed out or reduced to *nil*, or thereabout, and coated chocolates devoid of tails will be produced. These coated chocolates then resemble the hand-coated chocolates. The slitted or perforated air delivery appliance may be connected with any suitable source of compressed air supply, which it is not deemed necessary to here illustrate, and adapted for valve control. The current of air may be delivered continuously, or, if desired, intermittently, and in case an intermittent air blast is desired, a valve or damper 50, see Fig. 9, may be arranged at the delivery opening of the appliance, or elsewhere, by which the current of air will be controlled, and said valve or damper may be adapted for hand-operation or otherwise.

I have discovered that when the slitted or perforated air delivering element is arranged beneath the top portion of the screen conveyer and close to, but back of the end roll, and adjusted to a proper angle but in the direction of motion of the conveyer, that a current of air can be blown upward through the screen conveyer and engage the bottoms of the chocolates in such manner as to prevent the formation of tails, or to eliminate them, if formed, or if they are tending to form. Therefore, I wish it to be understood that when a current of air is blown in an upward direction against the bottoms of the coated chocolates, either past the end of the conveyer which the chocolates are leaving, or through the conveyer at or near the end thereof, whereby the formation of tails or their tendency to form is prevented, or if formed they are reduced, comes within the spirit and scope of my invention.

I have herein referred to the use of a current of air, that being the most convenient gas to use, but some other suitable gas may be used, if desired, without departing from my invention, and the term "air" is understood to include such suitable gas. Warm air is usually employed, otherwise the coating will become chilled, and therefore solidify too quickly. My invention is here shown as applied to a well-known type of chocolate coating machine, but it is not intended to limit its application to this machine.

I claim:—

1. That improvement in the art of coating chocolates and other goods, which consists in blowing back onto the chocolates any tails which are formed thereon upon leaving the conveyer.

2. That improvement in the art of coating chocolates and other goods, which consists in blowing back onto the chocolates leaving the conveyer excess portions of coating material thereon.

3. A machine for coating chocolates or other goods, having in combination, a conveyer for the chocolates which have a coating material thereon, and pneumatic means arranged to deliver a current of air against the bottoms of the chocolates, beyond but closely adjacent to the end of the conveyer.

4. A machine for coating chocolates or other goods, having in combination, a conveyer for the chocolates which have a coating material thereon, and pneumatic means arranged to deliver a current of air in an upward direction against the bottoms of the chocolates beyond but closely adjacent to the end of the conveyer.

5. A machine for coating chocolates or other goods, having in combination, a conveyer for the chocolates which have a coating material thereon, and pneumatic means arranged to deliver a current of air against the bottoms of the chocolates at the end of the conveyer to blow back upon the chocolates the excess coating material so that the coated chocolates will be devoid of tails.

6. A machine for coating chocolates or other goods, having in combination, a conveyer for the chocolates which have a coating material thereon, and pneumatic means arranged to deliver a current of air in an upward direction against the bottoms of the chocolates at the end of the conveyer to blow back upon the chocolates the excess material so that the coated chocolates will be devoid of tails.

7. A machine for coating chocolates and other goods, having in combination, two conveyers, with adjacently disposed end-portions, and pneumatic means arranged to deliver a current of air which engages the chocolates passing from one to the other conveyer and blows back upon the chocolates the excess coating material.

8. A machine for coating chocolates and other goods, having in combination, two conveyers arranged one in continuation of the other, and pneumatic means arranged to forcibly deliver a current of air at the adjacent ends of said conveyers.

9. A machine for coating chocolates and other goods, having in combination, two conveyers with adjacently disposed end-portions, and pneumatic means arranged to deliver a current of air between said end-portions.

10. A machine for coating chocolates and other goods, having in combination, two conveyers arranged with adjacently disposed end-portions, and pneumatic means arranged to forcibly deliver a current of air in an upward direction at said adjacent end-portions of the conveyers.

11. A machine for coating chocolates and other goods, having in combination, two endless conveyers arranged one in continuation of the other, with adjacently disposed end-portions, and pneumatic means arranged to deliver a current of air in an upward direction between the adjacent ends of the two conveyers, and tangential to the cylindrical surface of the end-portions thereof.

12. A machine for coating chocolates and other goods, having in combination, two conveyers arranged one in continuation of the other, with adjacently disposed end-portions, and pneumatic means arranged to forcibly deliver a current of air at the adjacent ends of said conveyers, said means being movable whereby the direction of the air current may be varied.

13. A machine for coating chocolates and other goods, having in combination, an endless screen conveyer and an endless conveyer arranged in continuation thereof, with adjacently disposed end-portions, and pneumatic means adapted to deliver a current of air to engage the chocolates beyond but closely adjacent to the end of the screw conveyer.

14. A machine for coating chocolates and other goods, having in combination, two conveyers arranged one in continuation of the other, with adjacently disposed end-portions, and pneumatic means arranged to forcibly deliver a current of air to engage the chocolates while passing from one to the other conveyer to blow back upon the chocolates the excess material, and controlling-means for said pneumatic means, whereby the delivery of air may be controlled.

15. A machine for coating chocolates having a conveyer for delivering chocolates to another supporting member, and pneumatic means arranged to deliver a current of air at the leaving end of said conveyer to engage the bottoms of the chocolates and blow back upon the chocolates the excess coating material.

In testimony whereof, I have signed my name to this specification, in the presence of two subscribing witnesses.

DALE G. STEELY.

Witnesses:
GEORGE F. WALLBURG,
WILLIAM E. SHERWOOD.